United States Patent [19]

Chen

[11] Patent Number: 5,751,725
[45] Date of Patent: May 12, 1998

[54] METHOD AND APPARATUS FOR DETERMINING THE RATE OF RECEIVED DATA IN A VARIABLE RATE COMMUNICATION SYSTEM

[75] Inventor: Tao Chen, San Diego, Calif.

[73] Assignee: Qualcomm Incorporated, San Diego, Calif.

[21] Appl. No.: 730,863

[22] Filed: Oct. 18, 1996

[51] Int. Cl.$^6$ .................................................... G06F 11/00
[52] U.S. Cl. ............................................. 371/5.5; 371/38.1
[58] Field of Search .......................... 371/5.5, 27, 37.7, 371/38.1, 39.1, 44, 50.1; 375/225, 222, 200; 455/422

[56] References Cited

U.S. PATENT DOCUMENTS

| | | | |
|---|---|---|---|
| 4,748,626 | 5/1988 | Wong | 371/30 |
| 4,845,714 | 7/1989 | Zook | 371/50 |
| 5,023,889 | 6/1991 | Divsalar et al. | 375/27 |
| 5,056,117 | 10/1991 | Gitlin et al. | 375/102 |
| 5,416,787 | 5/1995 | Kodama et al. | 371/43 |
| 5,485,486 | 1/1996 | Gilhousen et al. | 370/335 |
| 5,566,206 | 10/1996 | Butler et al. | 375/225 |

FOREIGN PATENT DOCUMENTS

| | | | |
|---|---|---|---|
| 0413505 | 2/1991 | European Pat. Off. | H03M 13/12 |
| 0544315 | 6/1993 | European Pat. Off. | H03M 13/00 |
| 9314588 | 7/1993 | WIPO | H04L 27/30 |

OTHER PUBLICATIONS

Hirosuke Yamamoto et al., "Viterbi Decoding Algorithm for Convolutional Codes with Repeat Request", *IEEE Transactions on Information Theory*, vol. IT-26, No. 5, Sep. 1980, pp. 540-547.

W. C. Wong et al., "Combined Source and Channel Coding of Subband Coded Speech with Post-Enhancement", Communication Systems: Toward Global Integration, vol. 2, Nov. 1990, pp. 886-890.

N. Seshadri et al., "Generalized Viterbi Algorithms for Error Detection with Convolutional Codes", *IEEE*, 1989, pp. 1534-1538.

*Primary Examiner*—Vincent P. Canney
*Attorney, Agent, or Firm*—Russell B. Miller; Sean English

[57] ABSTRACT

The apparatus and method are employed in a communications system has a transmitter and a receiver, where the receiver determines at which of several rates individual frames in a signal have been transmitted by the transmitter. For example, if the transmitter employs four transmission rates, the receiver decodes each frame of the received signal based on the four rates to produce four cyclic redundancy check (CRC) bits, four symbol error rate (SER) values and one or more Yamamoto check values. If only two of the CRC bits check, then the receiver compares to each other the SER values for those two rates to determine at which of the two rates a current frame was transmitted. If only one of the CRC bits check for a given rate, then the SER value for that rate is compared with a maximum SER threshold for that rate. Additionally, SER values for the other rates can be compared to minimum SER thresholds. Furthermore, the Yamamoto check values can be analyzed to determined whether looser or tighter minimum and maximum SER thresholds should be employed if the Yamamoto values check for the current rate, or do not check, respectively.

52 Claims, 6 Drawing Sheets

METHOD AND APPARATUS FOR DETERMINING THE RATE OF RECEIVED DATA IN A VARIABLE RATE COMMUNICATION SYSTEM

BACKGROUND OF THE INVENTION

I. Field of the Invention

The present invention relates to communications. More particularly, the present invention relates to a method and apparatus for determining transmission rate in a variable rate transmission system.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth.

Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A OFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention, and incorporated by reference herein.

CDMA systems often employ a variable rate vocoder to encode data so that the data rate can be varied from one data frame to another. An exemplary embodiment of a variable rate vocoder is described in U.S. Pat. No. 5,414,796, entitled "VARIABLE RATE VOCODER," assigned to the assignee of the present invention and incorporated by reference herein. The use of a variable rate communications channel reduces mutual interference by eliminating unnecessary transmissions when there is no useful speech to be transmitted. Algorithms are utilized within the vocoder for generating a varying number of information bits in each frame in accordance with variations in speech activity. For example, a vocoder with a rate set of four may produce 20 millisecond data frames containing 20, 40, 80, or 160 bits, depending on the activity of the speaker. It is desired to transmit each data frame in a fixed amount of time by varying the transmission rate of communications. Additional details on the formatting of the vocoder data into data frames are described in U.S. Pat. No. 5,511,073, entitled "METHOD AND APPARATUS FOR THE FORMATTING OF DATA FOR TRANSMISSION," assigned to the assignee of the present invention, and incorporated by reference herein.

One technique for the receiver to determine the rate of a received data frame is described in U.S. Pat. No. 5,566,206, entitled "METHOD AND APPARATUS FOR DETERMINING DATA RATE OF TRANSMITTED VARIABLE RATE DATA IN A COMMUNICATIONS RECEIVER," issued Oct. 15, 1996, assigned to the assignee of the present invention and incorporated by reference herein. Another technique is described in copending U.S. patent application Ser. No. 08/126,477, entitled "MULTIRATE SERIAL VITERBI DECODER FOR CODE DIVISION MULTIPLE ACCESS SYSTEM APPLICATIONS," filed Sept. 24, 1993, assigned to the assignee of the present invention, and incorporated by reference herein. According to these techniques, each received data frame is decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics and determines the most probable rate at which the incoming symbols were transmitted.

SUMMARY OF THE INVENTION

The present invention provides a novel and improved apparatus and method for decoding data. The apparatus and method are employed in a communications system having a transmitter and a receiver, where the receiver determines at which of several rates individual frames in a signal has been transmitted by the transmitter. For example, if the transmitter employs four transmission rates, the receiver decodes each frame of the received signal based on the four rates to produce four cyclic redundancy check (CRC) bits, four symbol error rate (SER) values and one or more Yamamoto check values. If the CRC checks for only two rates, then the receiver compares to each other the SER values for those two rates to determine at which of the two rates a current frame was transmitted. If the CRC checks for only one rate, then the SER value for that rate is compared with a maximum SER threshold for that rate. Additionally, SER values for the other rates can be compared to minimum SER thresholds. Furthermore, the Yamamoto check values can be analyzed to determined whether looser or tighter minimum and maximum SER thresholds should be employed if the Yamamoto values check for the current rate, or do not check, respectively.

Broadly stated, the present invention embodies a method for use in a communication system having a transmitter and a receiver. The transmitter transmits a signal at a current rate, wherein the current rate corresponds to one of a plurality of rates. The receiver generates a plurality of check error values and error rate codes, and at least one decoding code, each based on whether the signal has one of the plurality of rates. The method determines the current rate of the signal and includes the steps of: (a) determining if only a first check value of a selected rate favorably checks, wherein the selected rate is one of the plurality of rates; (b) determining if the selected rate corresponds to a predetermined rate; (c)

if the selected rate corresponds to the predetermined rate, comparing a selected decoding code to a selected value; (d) if the selected rate does not correspond to the predetermined rate, comparing a selected error rate code to a first value based on a predetermined operational relationship, wherein the selected rate code corresponds to the selected rate; (e) if the selected decoding code corresponds to the selected value, comparing the selected error rate code to a second value based on the predetermined operational relationship; (f) if the selected decoding code does not correspond to the selected value, comparing the selected error rate code to a third value based on the predetermined operational relationship; and (g) determining that the current rate of the signal is the selected rate if the selected error rate code has the predetermined operational relationship to the first, second or third values.

Broadly stated, the present invention also embodies a method for determining the current rate of the signal having the steps of: (a) determining that only first and second error check values of first and second rates favorably check, wherein the first and second rates are from the plurality of rates; (b) comparing a first error rate code to a second error rate code plus a first value based on a predetermined operational relationship, wherein the first and second error rate codes correspond to the first and second rates; and (c) determining that the current rate of the signal is the second rate if the first error rate code has the predetermined operational relationship to the second error rate code plus a first value, and otherwise determining that the current rate is the first rate.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
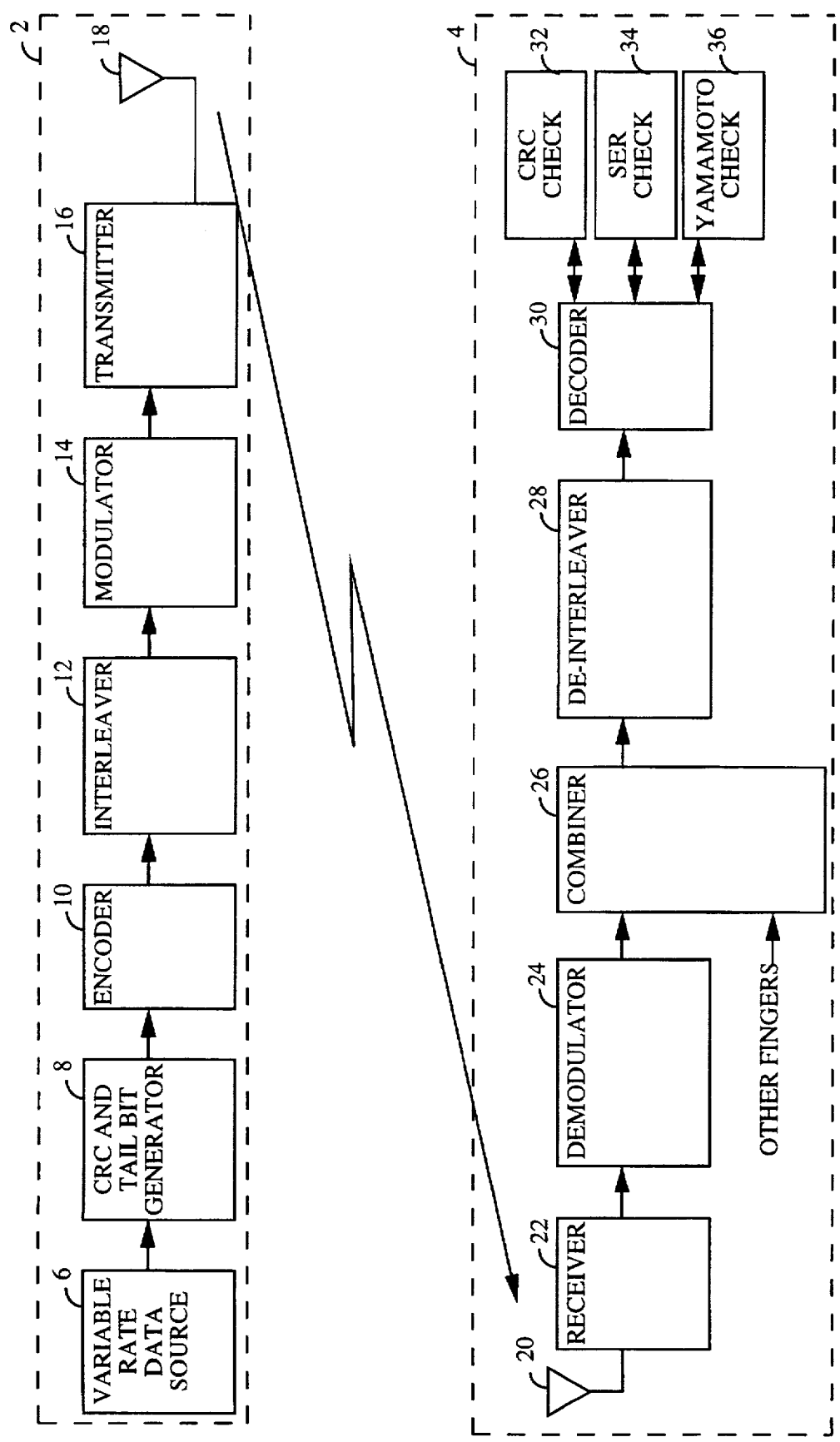
FIG. 1 is a block diagram of the communication system of the present invention.

Referring to FIG. 1, a remote transmission system 2 transmits data to a remote receiving system 4. In an exemplary embodiment, the present invention is implemented in a wireless communication system which communicates using spread spectrum modulation signals. Communication using spread spectrum communication systems is described in detail in the aforementioned U.S. Pat. Nos. 4,901,307 and 5,103,459.

A variable rate data source 6 provides variable rate data frames for transmission to a Cyclic Redundancy Check (CRC) and Tail Bit Generator 8.

In the exemplary embodiment, the data source 6 is a variable rate vocoder for encoding speech information at four variable rates as described in detail in the aforementioned U.S Pat. No. 5,414,796. When used, for example, in a cellular telephone environment, the signal is transmitted at the full rate to transmit speech (i.e., when a user is talking) and is transmitted at the eighth rate to transmit silence (i.e., when the user is not talking). The eighth rate saves on the number of bits transmitted, and thereby saves on power. In general, 90% of the signals transmitted by the transmitter 2 to the receiver 4 are either at the full or one-eighth rate. The one-half and one-quarter rates represent transitional rates between the full and eighth rates.

The generator 8 generates a set of CRC bits to provide for error detection at the receiver as is well known in the art. In addition, the generator 8 appends a sequence of tail bits to the frame. In the exemplary embodiment, the generator 8 generates the set of CRC and tail bits in accordance with the Telecommunications Industry Association's *TIA/EIA/IS-95-A Mobile Stations-Base Station Compatibility Standard for Dual-Mode Wideband Spread Sepctrum Cellular System.*

The data frame is provided by the generator 8 to an encoder 10 which encodes the data as symbols for error correction and detection at the receiver.

In the exemplary embodiment, the encoder 10 is a rate ½ convolutional encoder. The encoded symbols are provided to an interleaver 12, which reorders the encoded symbols in accordance with a predetermined interleaving format. In the exemplary embodiment, the interleaver 12 is a block interleaver, the design and implementation of which is well known in the art.

The reordered frame is then provided to a modulator 14 which modulates the frame for transmission. In the exemplary embodiment, the modulator 14 is a CDMA modulator, the implementation of which is described in detail in the aforementioned U.S. Pat. Nos. 4,901,307 and 5,103,459. The modulated data frame is provided to a transmitter (TMTR) 16. The transmitter 16 upconverts and amplifies the signal for transmission through an antenna 18.

The transmitted signal is received by an antenna 20 of a remote station 4, such as a cellular phone, and provided to a receiver (RCVR) 22 which down converts and amplifies the received signal. The received signal is then provided to a demodulator (DEMOD) 24 which demodulates the signal. In the exemplary embodiment, the demodulator 24 is a CDMA demodulator 24, the implementation of which is described in detail in the aforementioned U.S. Pat. Nos. 4,901,307 and 5,103,459.

The demodulated signal is then provided to a diversity combiner 26. The diversity combiner 26 combines the demodulated signal from the demodulator 24 with demodulated signals from other demodulators (not shown) which demodulate the same signal except provided on a different propagation path. The design and implementation of the diversity combiner 26 is described in detail in the aforementioned U.S. Pat. No. 5,109,390. The diversity combined signal is provided to a de-interleaver 28 which re-orders the symbols in the frame in accordance with a predetermined re-ordering format as is well known in the art.

The re-ordered frame is then provided to a multi-rate decoder 30, which provides error correction on the frame of symbols. The decoder 30 decodes the data based on a predetermined set of rate hypotheses. In the exemplary embodiment, the decoder 30 is a multi-rate Viterbi decoder as is described in detail in the aforementioned copending U.S. patent application Ser. No. 08/126,477 now abandoned and file-wrap continued as U.S. patent application Ser. No. 08/728,101.

In the exemplary embodiment, the decoder 30 decodes the symbols for each of the four possible rates to provide four separately decoded frames of data, each of which is provided to a CRC check detector 32. The CRC check detector 32 determines under conventional techniques whether the cyclic redundancy check bits for each frame are correct for the decoded data. The CRC check detector 32 performs a CRC check for the CRC bits in the four decoded frames to help determine whether the currently received frame was transmitted at the full, half, quarter or eighth rates. As a result, the CRC check detector 32 provides four check bits, $C_1$, $C_2$, $C_4$ and $C_8$, where a binary value of "1" for a given CRC check bit can indicate that the CRC check matched or checked, while a binary value of "0" can indicate that the CRC bits did not check. As used generally herein, the subscript or indication "1" corresponds to the full rate, "2" corresponds to the half rate, "4" corresponds to the quarter rate and "8" corresponds to the eighth rate.

In addition, the decoder 30 provides the decoded data to a symbol error rate (SER) check detector 34. The SER detector 34 receives the decoded bits and an estimate of the received symbol data from the decoder 30. As is known, the SER detector 34 re-encodes the decoded bits, and compares them to the estimate of the received symbol data from the decoder 30. The SER is a count of the number of discrepancies between the re-encoded symbol data and the received symbol data. Therefore, the SER detector 34 generates four SER values: $SER_1$, $SER_2$, $SER_4$ and $SER_8$. For processing efficiency, the SER detector 34 provides SER values having a maximum value of 255. In addition to the CRC bits, the SER values help provide a determination of the rate of the current frame transmitted by the transmitter 2, and whether the frame has errors.

Furthermore, the decoder 30 provides information to a Yamamoto check detector 36 which provides a confidence metric based on the difference between the selected path through a trellis and the next closest path through the trellis. While the CRC check is dependent on the bits in each of the four decoded frames, the Yamamoto check is dependent on the decoding process of the receiver 4. The Yamamoto detector 36, as with the detectors 32 and 34, provides four Yamamoto values for each of the four possible rates: $Y_1$, $Y_2$, $Y_4$ and $Y_8$. Although the detectors 32, 34 and 36 are shown as separate elements, the detectors can be incorporated within the hardware of the decoder 30.

A control processor receives the CRC check bits, SER values and Yamamoto values from the detectors 32, 34 and 36, respectively. The processor then determines at which of the four rates the currently received frame was sent. The decoder 30 provides four decoded frames for storage in a decoded frame buffer, where each of the four frames is decoded under one of the four rates. Based on the rate determined by the processor, the control processor provides a signal to the decoded frame buffer, which in response thereto, outputs the stored frame decoded at the determined rate or outputs no frame if an erasure is declared. In an alternative embodiment, decoder frame buffer outputs a signal indicative of a frame erasure if an erasure is declared.

Under the communication system of FIG. 1, the signal transmitted by the transmitter 2 to the receiver 4 can rapidly change between the four rates.

As a result, the transmitter 2 does not include within the transmitted signal an actual indication as to the rate at which the signal is currently being transmitted. To do so would require unnecessary bandwidth. Therefore, the transmitter 2 transmits a frame at a current rate (selected from one of the four rates), and a control processor and the decoder 30 of the receiver 4, under routines described below, determine at which of the four rates the currently received frame was sent or whether an erasure should be declared (i.e., whether the current frame was sent at the full, half, quarter or eighth rate). The decoder 30 then decodes the one of four decoded frames which has the determined rate and outputs a decoded signal. The appropriately decoded signal can then be input to, for example, a vocoder, amplifier and speaker (not shown) to output a voice signal to be heard by a user of the receiver 4.

The control processor, coupled to at least the decoder 30, operates in conjunction with the methods illustrated in the flow diagrams of FIGS. 2-5 to select the appropriate decoded frame to be output or provided to the user, or to declare the current frame an erasure condition. While the control processor and decoder 30 are shown as separate elements, the control processor and decoder can be incorporated together to form a single decoder.

Figure 2:
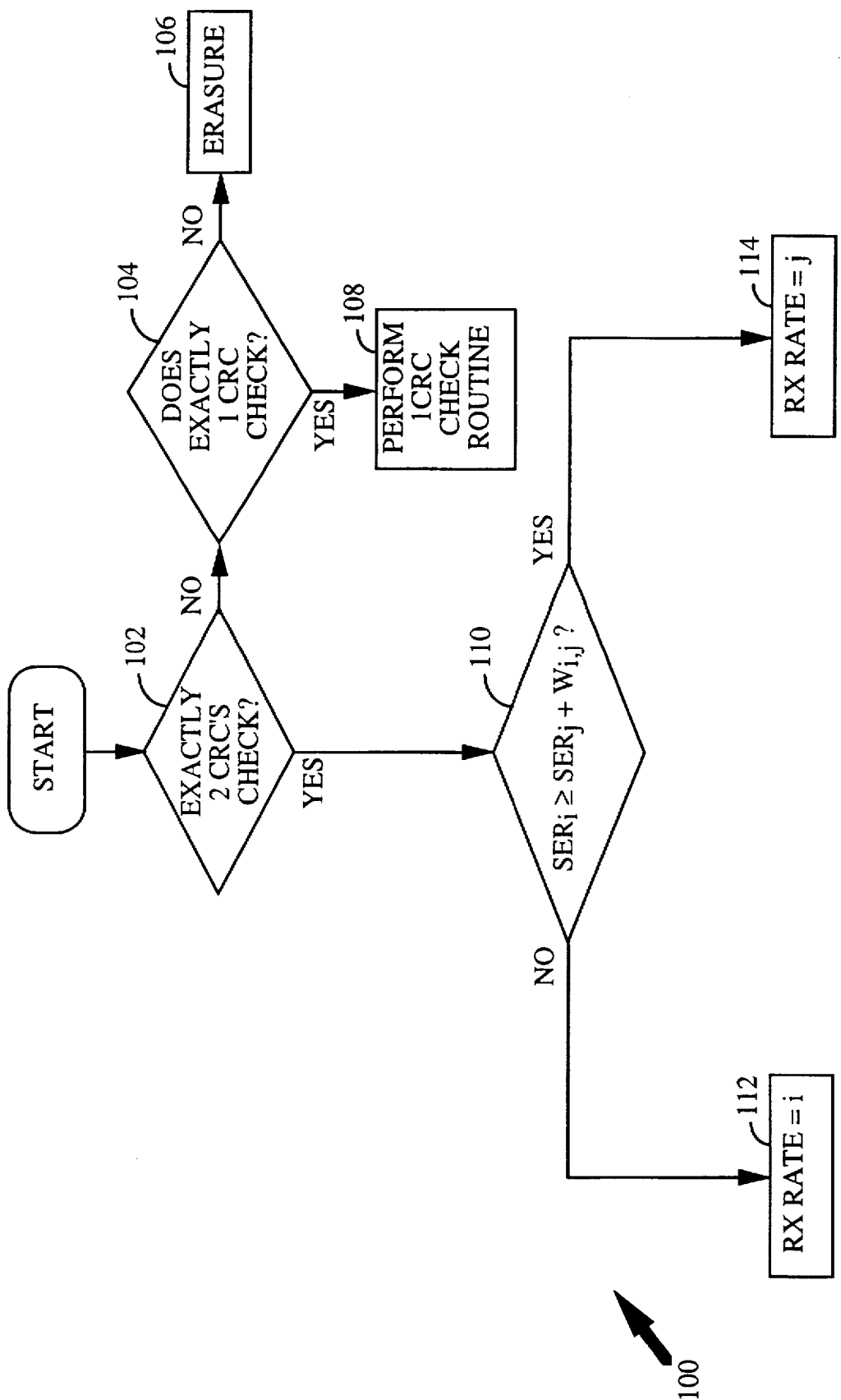
FIG. 2 is a flowchart illustrating a method for selecting the decoded frame when the CRC checks for two different rates.

Referring to FIG. 2, an exemplary routine 100 performed by the processor first determines in step 102 whether the CRC checks for two of the four rates. For example, if the processor determines that the CRC for the full and eighth rates check (i.e., bits $C_1=C_8=1$), but the CRCs do not check for the half and quarter rates (i.e., bits $C_2=C_4=0$), then the processor determines that step 102 is satisfied. If the CRCs for exactly two rates check in step 102, then the current frame can have three possible interpretations: it could be erased, it could have been transmitted at a first rate i corresponding to the first rate that checked its CRC, or it could have been transmitted at a second rate j corresponding to the second rate that checked its CRC.

However, if the CRCs for less than two or greater than two of the rates check, then in step 104, the processor determines whether the CRC for exactly one rate checks. If so, then in step 108, the processor performs a one CRC check routine as described below. However, if the CRCs for none of the rates check, or if the CRCs for three or four rates check, then in step 106, the processor declares the currently received frame an erasure. In general, if the CRCs for none of the rates check, then the current frame is erased. Alternatively, if the CRCs for three or four of the rates check, then, while the processor could still determine the current rate of the currently received frame, such a determination is computationally difficult, can have a higher probability of error, and generally requires too much processing overhead to rapidly and accurately determine the rate for the current frame. Therefore, it is simply easier for the processor to declare the current frame an erasure.

If the CRCs for two rates check in step 102, then in step 110, the processor compares the SER values for the two rates that checked in step 102. For example, if the CRCs for the full and eighth rates check in step 102, then the processor in step 110 determines whether the SER value for the full rate ($SER_1$) is greater than or equal to the SER value for the eighth rate ($SER_8$) plus a weighting value W determined based on the full and eighth rates ($W_{1,8}$). In general, the processor under step 110 compares the SERs based on the following equation:

$$SER_i \geq SER_j + W_{ij} \qquad (1)$$

where i and j refer to the two rates corresponding to the two rates that checked under step 102.

The weighting or scaling value W can have one of six possible values, since i and j can have one of four possible values based on the four rates (i.e., $W_{1,2}$, $W_{1,4}$, $W_{1,8}$, $W_{2,4}$, $W_{2,8}$, and $W_{4,8}$). Additionally, the weighting value W can have a value ranging from −255 to +255 since the SER values have a maximum value of 255. The weighting value W is generally necessary because, of the different probability densities of the SERs for the possible rates, and the differences in the chances of the CRC checking given the different actual frame rates from the transmitter. The weighting value W is preferably established based on empirical data provided through experimentation. By establishing a target acceptable error rate, and testing the response of the communication system of FIG. 1 under the four rates, empirical data resulting therefrom is used to determine a weighting value W for each of the six combination of rates.

In general, the weighting value W provides an increased level of confidence as to which of the two rates the currently received frame was transmitted. Simply determining that the current rate is equal to the rate having the lower SER can result in incorrectly determining the rate of the current frame. Therefore, the $SER_i$ value must be less than the $SER_j$ is value plus a weighting factor for the processor to determine that the rate of the currently received frame is equal to the rate i.

Sometimes, it is less desirable to decode a current frame at an incorrect rate than to declare a current frame an erasure. This is accomodated in the present invention. If a current frame is decoded at the wrong rate, the decoder 30 will output a noisy signal that can be amplified and broadcast to a user's ear. Such a noisy signal can be perceptually undesirable to a user. As a result, the present invention sacrifices a little higher frame erasure rate, in exchange for not decoding a current frame at the wrong rate. Nevertheless, the receiver 4 preferably attempts to maintain a frame erasure rate of less than 1%. Preferably, the probability of the wrong rate being determined under the routines described herein are less than or equal to $10^{-5}$.

If the $SER_i$ value is greater than or equal to the $SER_j$ value plus the weighting value $W_{i,j}$, then in step 112, the processor determines that the rate of the current frame received from the transmitter 2 is at the rate i. Alternatively, if the $SER_i$ value is less than the $SER_j$ value plus $W_{i,j}$, then in step 114, the processor determines that the rate of the current frame received from the transmitter 2 is equal to the rate j. In the above example, where i and j correspond to the full and eighth rates, respectively, if the $SER_1$ value is greater than or equal to the $SER_8$ value plus the weighting value $W_{1,8}$, then the rate of the currently received frame is equal to the full rate under step 112, otherwise, the rate is equal to the one-eighth rate under step 114. After determining the rate of the current frame, the processor provides an appropriate signal to the buffer, which in response thereto, outputs the frame decoded corresponding to the determined rate or no frame if an erasure is declared.

Figure 3:
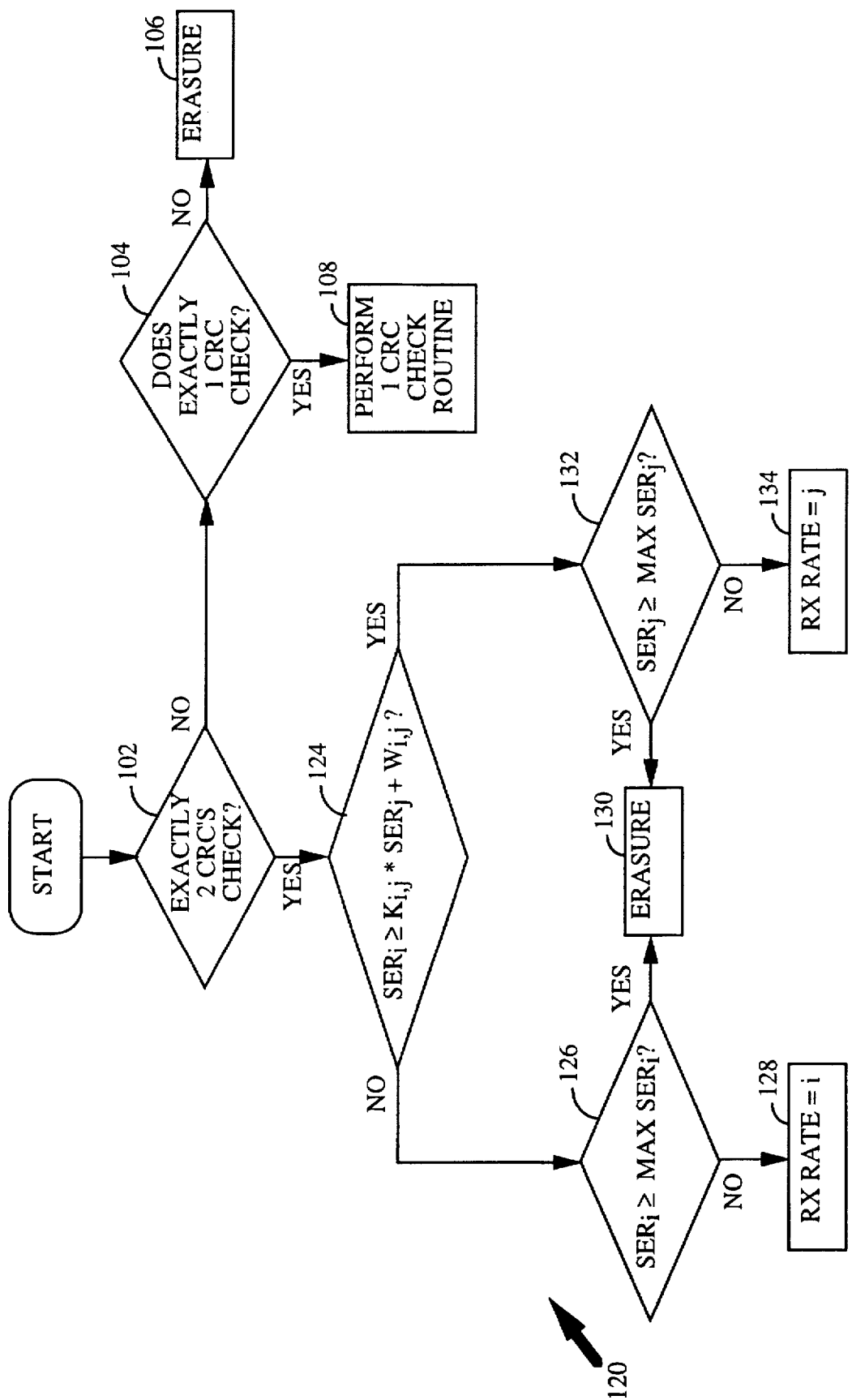
FIG. 3 is a flowchart illustrating an alternative method for selecting the decoded frame when the CRC checks for two different rates.

An alternative embodiment according to the present invention for determining the received signal rate where two of the four rates check is shown in FIG. 3 as a routine 120. This and other alternative embodiments described below are similar to their corresponding previously described embodiment, and common steps are identified by the same reference numerals. Only the significant differences in operation are described in detail.

Referring to FIG. 3, the routine 120 performs the same steps 102, 104, 106 and 108 as described above with respect to the routine 100. In step 124, if the CRCs for two of the rates check under step 102, then the processor employs a more accurate comparison between the SER values for the two rates identified under step 102 to further ensure that the current frame is decoded under the appropriate rate. Specifically, the processor in step 124 employs a multiplicative factor $k_{i,j}$ in equation (1) above, to provide the following comparative function:

$$SER_i \geq k_{i,j} * SER_j + W_{i,j}. \qquad (2)$$

As with the weighting value W, the multiplicative factor $k_{i,j}$ is preferably determined through experimentation based on empirical data for the four transmission rates. Therefore, six possible multiplicative factors are possible based on the four transmission rates (i.e., $k_{1,2}$, $k_{1,4}$, $k_{1,8}$, $k_{2,4}$, $k_{2,8}$, and $k_{4,8}$). The multiplicative factor k can simply be a normalization factor so that, for example, if i is equal to full and j is equal to half, then $k_{1,2}$ would be equal to two to normalize the half rate $SER_2$ value with respect to the $SER_1$ value. Alternatively, the multiplicative factor k can include not only a 5 normalization factor, but compensate for differences between the different transmission rates, as described below.

Figure 6:
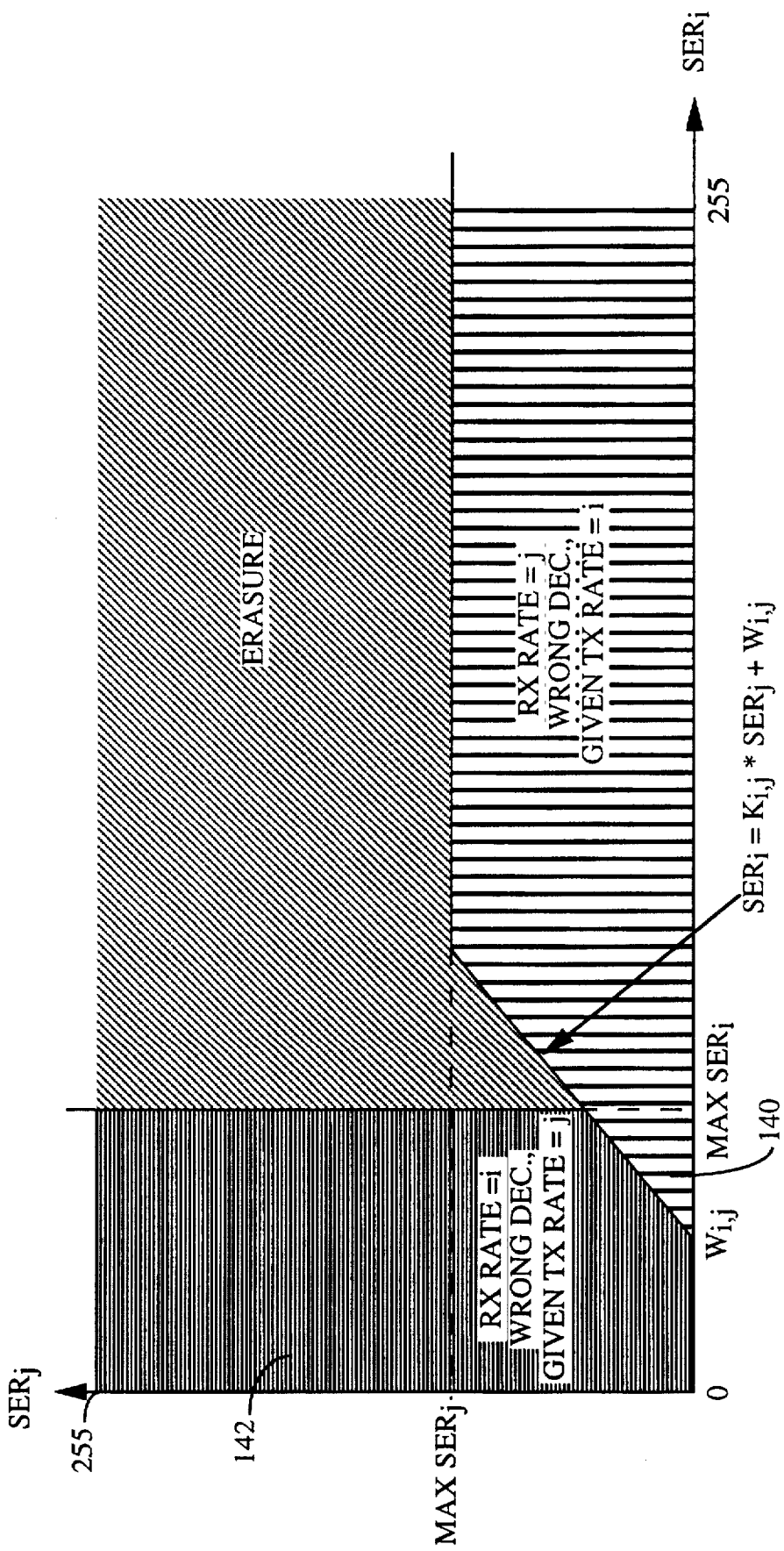
FIG. 6 is a plot of rate decision regions for symbol error rates i and j where the CRC checks for both rates i and j.

Referring to FIG. 6, a simplified diagram is shown of rate decision regions for SER values $SER_i$ and $SER_j$, where CRCs for rates i and j check. In general, a line $SER_i = k_{i,j} * SER_j + W_{i,j}$ separates a $SER_i$ region 140 from an $SER_j$ region 142. As a result, the multiplicative factor $k_{i,j}$ determines the slope of the line, while the weighting value $W_{i,j}$ determines its offset from the origin (its Y-axis intercept). In general, the multiplicative factor k and weighting value W vary the decision range for areas 140 and 142. If, for example, the $SER_i$ value for the current frame is less than the $SER_j$ value, this frame provides a point above the line $SER_i = k_{i,j} * SER_j + W_{i,j}$ and in the $SER_j$ region 142. Under such an example, the rate of the received frame is then likely equal to j.

One can build probability density curves based on the empirical data collected through experimentation and define a target acceptable error rate. Thereafter, one can integrate under a portion of the probability density curves, below the target acceptable error rate, to determine minimum and maximum SER threshold values (discussed below), for each rate. The empirical data can be input to spreadsheets and known numerical analysis techniques can be employed under the spreadsheets to provide optimized values below the target acceptable error rate. In sum, one can determine through experimentation the probabilities that the current rate is i based on given SER values, where these probabilities are then plotted based on the $SER_i$ value and the SER values for the other rates (e.g., $SER_j$).

In general, the routine 120 and the other routines described herein employ functions based on two rates and two SERs, $SER_i$, $SER_j$ (i.e. f(i, j, $SER_i$, $SER_j$). Under the exemplary embodiment, the present invention employs linear equations such as equation (2) above, and as represented in FIG. 6.

The weighting value W, the multiplicative factor k, and the maximum and minimum SER thresholds (discussed below) are preferably stored in memory as a look-up table (not shown) to be accessed by the processor.

In step 124, the processor essentially determines on which side of the line in FIG. 6 a point defined by the two SER values ($SER_i$, $SER_j$) exists, to thereby determine the most likely rate for the currently received frame. If the $SER_i$ value is less than $k_{i,j}$ times the $SER_j$ value plus $W_{i,j}$, then in step 126, the processor determines whether the $SER_i$ is greater than a maximum acceptable SER threshold for rate i (i.e., $MaxSER_i$). In general, there is a maximum SER threshold value for the given rate beyond which the robability of error (of decoding at the incorrect rate) is unacceptable. As noted above, the maximum SER thresholds, shown in FIG. 6, are determined based on empirical data derived through experimentation with the four rates. If the $SER_i$ value is less than the maximum $SER_i$ threshold, then the processor in step 128 determines that the rate of the currently received frame is equal to i. If, however, the $SER_i$ value is greater than or equal to the maximum $SER_i$ threshold, then in step 130 the processor determines that the current frame is an erasure.

If, under step 124, the processor determines that the $SER_i$ value is greater than or equal to $k_{i,j}$ times the $SER_j$ value plus $W_{i,j}$, then in step 132, the processor determines whether the $SER_j$ value is greater than or equal to a maximum SER threshold for rate j (i.e., $MaxSER_j$). If so, the processor in step 130 determines that the current frame is erased. However, if the $SER_j$ value is less than the maximum $SER_j$ threshold, then in step 134 the processor determines that the current frame was transmitted at the rate j.

Figure 4:
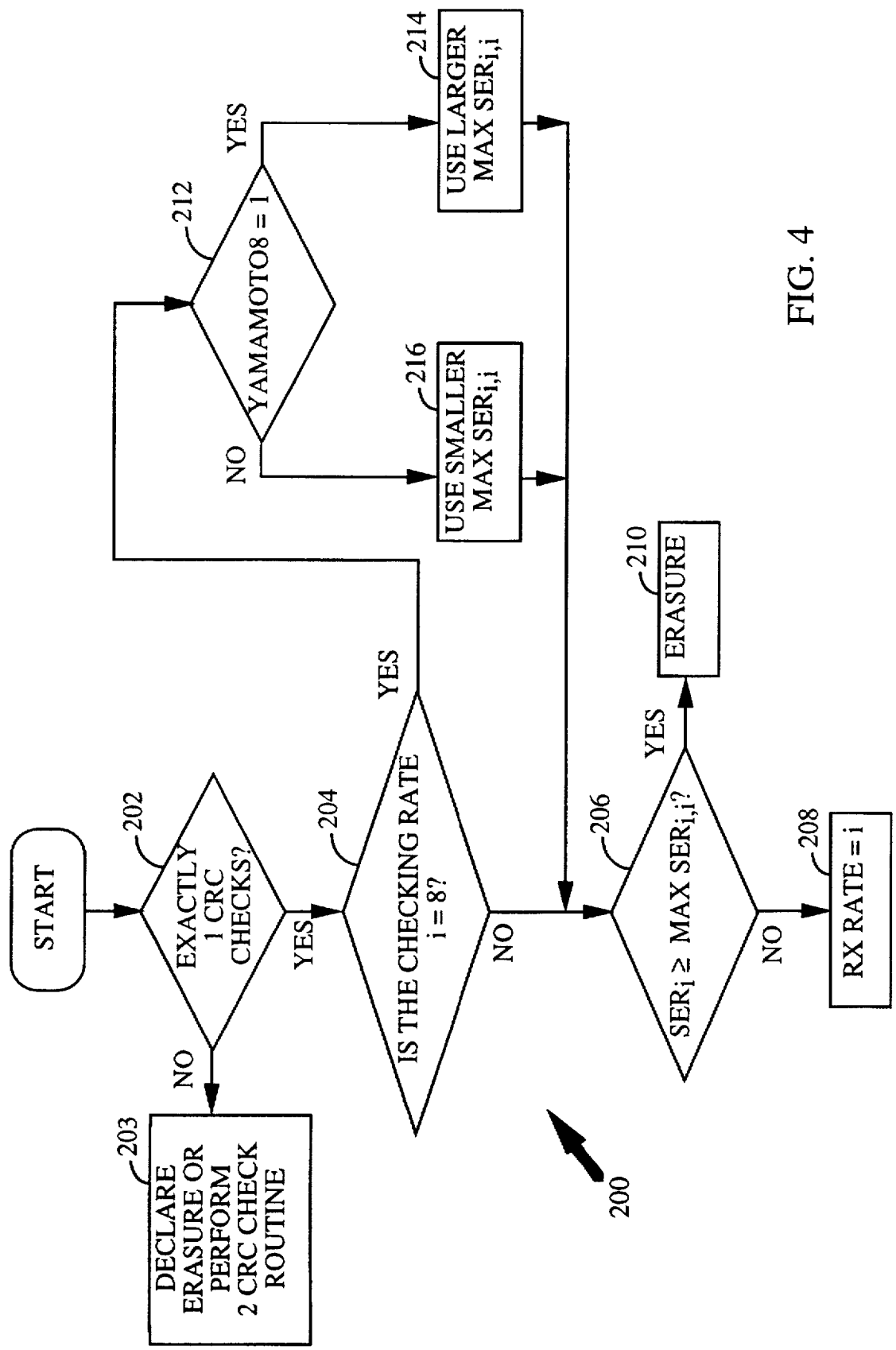
FIG. 4 is a flowchart illustrating a method for selecting the decoded frame when the CRC checks for one rate.

Referring to FIG. 4, a routine 200 is performed by the processor if the CRC for only one rate checks. As with step 104 (FIG. 2), the processor in step 202 first determines whether the CRC for exactly one rate checks. If not, then in step 203, the processor declares the current frame to be an erasure, or performs the two CRC check routines 100 or 120, as discussed above. If the CRC checks for only one rate under step 202, the processor under the routine 200 employs additional steps to confirm that the rate which checked under step 202 is in fact the correct rate for the current frame. Therefore, in step 204, the processor determines whether the rate which checked under step 202 corresponds to the eighth rate (i.e., i=8). If not, then in step 206, the processor determines whether the SER value for the determined rate is greater than or equal to a maximum SER threshold for that rate (i.e., $SER_i > MaxSER_i$). If it is less than the maximum, then in step 208, the processor determines that the rate of the currently received frame is equal to i; otherwise, in step 210, the processor declares an erasure.

If in step 204 the processor determines that the indicated rate is equal to the eighth rate, then in step 212, the processor examines the Yamamoto value for the eighth rate ($Y_8$). As is known, a frame at the eighth rate has fewer CRC bits than frames at the other rates, and as a result, the CRC more often. Therefore, the routine 200 employs additional checks to confirm that the current frame was transmitted at the eighth rate. Consequently, in step 212, if the Yamamoto value for the eighth rate checks (i.e., provides a binary "1" value to the decoder 30), then the processor has an increased level of confidence that the rate of the current frame is the eighth rate. Therefore, in step 214, the processor employs a larger or looser maximum SER value for the determined rate. Such a looser maximum SER threshold improves the probability that subsequent steps under the routine 200 will appropriately determine that the current frame was transmitted at the eighth rate.

Conversely, if the Yamamoto value does not check in step 212, then in step 216 the processor selects a smaller or tighter maximum SER value for the eighth rate. If the Yamamoto value does not check, the processor expects the current frame to be an erasure, and therefore makes subsequent comparisons more stringent to ensure that the current frame is determined to have been transmitted at the eighth rate under only the most stringent of comparisons. Under step 206, the processor employs the looser maximum SER value from step 214, or the tighter maximum SER value from step 216, and compares it to the eighth rate SER to determine whether the frame is erased (step 210) or confirms that the current frame was transmitted at the eighth rate (step 208).

Figure 5:
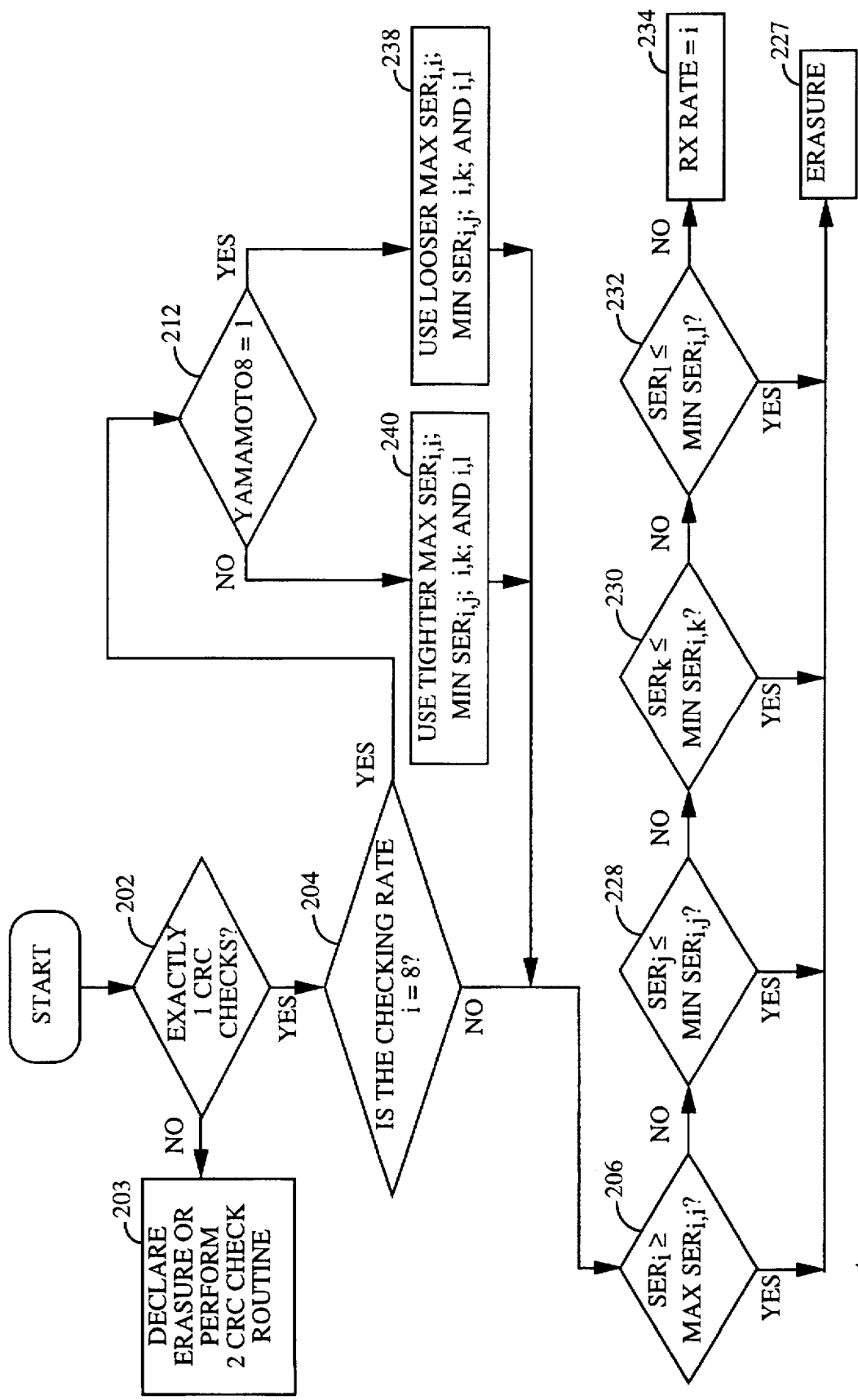
FIG. 5 is a flowchart illustrating an alternative method for selecting the decoded frame when the CRC checks for one rate.

Referring to FIG. 5, a more detailed analysis is shown as a routine 220. The processor under the routine 220 performs the steps 202,204, and 206 as discussed above. Thereafter, however, under steps 228, 230, and 232, the processor compares the SER values for the three rates which did not check under step 202 (i.e., rates j, k, and l), to minimum SER thresholds. This reduces the chances that one of the rates decoded with a low SER is actually the correct rate though the CRC did not check for that rate. The steps 228, 230 and 232 determine if the SER values for the other rates are greater than minimum thresholds for that rate, and if so, declare an erasure because the probability that the current frame was transmitted at that rate outweighs the probability that the current frame was transmitted at rate i.

Therefore, in step 228, the processor determines whether the $SER_j$ value is less than or equal to the minimum SER threshold for the determined rate i and the rate j (i.e., $SER_{i,j}$). If it is, then the processor declares the current frame an erasure under step 227. The reason for doing so is that the low SER of another rate (j) indicates an increased probability that the frame was transmitted at that rate (j). If it isn't, then under steps 230 and 232, the processor compares the last two SER values (for rates k and l) to corresponding minimum SER thresholds for the rate i and rates k or l ($SER_{i,k}$ and $SER_{i,l}$), respectively. If the $SER_k$ or $SER_l$ values are less than the minimum thresholds under steps 230 or 232, then the processor declares a current frame an erasure under step 227. However, if such SER values are greater than the minimum, then in step 234 the processor determines that the current frame was transmitted at rate i.

As under the routine 200, if the rate which checked under step 202 is determined to be the eighth rate in step 204, then the processor checks the Yamamoto values for the eighth rate under step 212 as discussed above. Therefore, if the Yamamoto value for the eighth rate checks, then in step 238 the processor not only employs a looser maximum SER threshold for the determined rate (the eighth rate), but also employs looser minimum SER thresholds for the determined and nondetermined rates (i.e., looser Min. $SER_{i,j}$, $SER_{i,k}$ and $SER_{i,l}$). Similarly, under step 240, if the Yamamoto value does not check under step 212, then in step 240 the processor not only employs a tighter maximum $SER_i$ threshold, but tighter minimum SER thresholds for the other rates (i.e., tighter Min. $SER_{i,j}$, $SER_{i,k}$ and $SER_{i,l}$). Therefore, for the eighth rate, the threshold lookup table employed by the processor includes two maximum threshold values for the eighth rate, and two sets of three minimum threshold values to be employed under steps 238 and 240.

Various alternatives to the various routines are available. For example, rather than simply comparing the determined and other SER values under steps 206, 228, 230 and 232 of the routine 220, the processor can compare the particular SER value to a linear function by multiplying the minimum or maximum SER threshold by the multiplicative factor k, and adding an appropriate weighting value W. For example, under step 206, the processor can compare the SER value $SER_i$ to the function $k_i*MaxSER_i+W_i$, while under step 228, the processor can compare the $SER_j$ value to the function $k_{i,j}*MinSER_{i,j}+W_{i,j}$. Moreover, a nonlinear function can be employed under steps 206–232. However, any improvement provided by a nonlinear function will likely, at best, provide only a small incremental benefit to the routine 220 and will lead to processing complexity and thus increased processing time.

While the Yamamoto values are checked only for the eighth rate, the routine 220 can be modified so that the Yamamoto values for the other rates are also checked. As a result, corresponding tighter or looser maximum and minimum SER thresholds would be employed for each of the other rates. A larger lookup table would therefore be required under such an alternative embodiment by the processor. Additionally, the routines 100, 120, 200 can employ such above alternatives, such as employing the Yamamoto check for each rate.

Rather than employing a lookup table having the weighting values W, multiplicative factors k, and minimum and maximum SER thresholds, such values could be algorithmically computed under appropriate equations. However, such equations are complex, and would require significant overhead of the processor. As a result, a faster, and therefore more expensive, microprocessor would be required under such an alternative.

Furthermore, the routines of the present invention can compare the currently determined rate (rate i) to previous rates. As noted above, 90% of the time the rate of the current frame is either at the full or eighth rate in the exemplary embodiment. Similarly, under the exemplary embodiment, the probability is high that the rate of the current frame is equal to the rate of the previous frame. If a person is talking, they will likely continue talking (causing the current frame to be at the full rate), while if they are silent, they will likely continue to be silent (maintaining the current frame at the eighth rate). As a result, the above-described routines can compare the determined rate of the current frame to the rate of the previous frame, and apply looser maximum and minimum SER thresholds. Alternatively, if the current determined rate differs from the previous rate, tighter thresholds can be applied.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communication systems, not necessarily the exemplary spread spectrum communications system described above. The present invention can employ the systems and methods of various patents and applications described above, all of which are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include any communications system that operates under the claims to provide rate determination. Accordingly, the invention is not limited by the disclosure, but instead its scope is to be determined entirely by the following claims.

I claim:

1. In a communication system having a transmitter that transmits to a receiver, said transmitter transmitting each of a plurality of frames at a current rate, wherein said current rate corresponds to one of a plurality of rates, a method at said receiver for determining said current rate of a current frame comprising the steps of:

generating a plurality of error check values each based on whether said current frame has one of said plurality of rates, wherein only a first check value of a selected rate favorably checks, and wherein said selected rate is one of said plurality of rates;

generating a plurality of error rate codes each based on whether said current frame has one of said plurality of rates, wherein a selected error rate code corresponds to said selected rate;

generating a plurality of decoding codes each based on whether said current frame has one of said plurality of rates, wherein a selected decoding code corresponds to said selected rate;

determining if said selected rate of said selected error rate code corresponds to a predetermined rate;

if said selected rate corresponds to said predetermined rate, comparing said selected decoding code to a selected value;

if said selected rate does not correspond to said predetermined rate, comparing said selected error rate code to a first value based on a predetermined operational relationship;

if said selected decoding code corresponds to said selected value, comparing said selected error rate code to a second value based on said predetermined operational relationship;

if said selected decoding code does not correspond to said selected value, comparing said selected error rate code to a third value based on said predetermined operational relationship; and determining that said current rate of said current frame is said selected rate if said selected error rate code has said predetermined operational relationship to said first, second or third value.

2. The method of claim 1 wherein the step of generating a plurality of error check values generates a plurality of cyclic redundancy check values, wherein the step of generating a plurality of error rate codes generates a plurality of symbol error rates, and wherein the step of generating a plurality of decoding codes generates a plurality of Yamamoto check codes.

3. The method of claim 1 wherein said plurality of rates include full, half, quarter and eighth rates, and wherein the step of determining if said selected rate of said selected error rate code corresponds to a predetermined rate determines if said selected rate corresponds to said eighth rate.

4. The method of claim 1 wherein the step of generating a plurality of decoding codes generates a plurality of Yamamoto check codes, and wherein the step of comparing said selected decoding code to a selected value includes the step of determining if said selected Yamamoto code checks acceptably.

5. The method of claim 1 wherein said first, second and third values are error rate code threshold values, wherein the steps of comparing said selected error rate code to said first, second and third values determines whether said selected error rate code is less than said first, second and third threshold values, respectively, and wherein said second threshold value is greater than said third threshold value.

6. The method of claim 1 wherein the step of determining that said current rate of said current frame is said selected rate includes the step of determining that said current frame is erased if said selected error rate code does not have said predetermined operational relationship to said first, second or third value.

7. The method of claim 1, further comprising the steps of:

comparing at least another of said error rate codes to a minimum threshold error rate code based on a selected operational relationship; and determining that said current frame is erased if said another of said error rate codes has said selected operational relationship to said minimum threshold.

8. In a communication system having a transmitter and a receiver, said transmitter transmitting a signal at a current rate, wherein said current rate corresponds to one of a plurality of rates, and wherein said receiver generates a plurality of error check values and error rate codes and at least one decoding code each based on whether said signal has one of said plurality of rates, a method for determining said current rate of said signal comprising the steps of:

- determining if only a first check value of a selected rate favorably checks, wherein said selected rate is one of said plurality of rates;
- determining if said selected rate corresponds to a predetermined rate;
- if said selected rate corresponds to said predetermined rate, comparing a selected decoding code to a selected value;
- if said selected rate does not correspond to said predetermined rate, comparing a selected error rate code to a first value based on a predetermined operational relationship, wherein said selected rate code corresponds to said selected rate;
- if said selected decoding code corresponds to said selected value, comparing said selected error rate code to a second value based on said predetermined operational relationship;
- if said selected decoding code does not correspond to said selected value, comparing said selected error rate code to a third value based on said predetermined operational relationship; and
- determining that said current rate of said signal is said selected rate if said selected error rate code has said predetermined operational relationship to said first, second or third value.

9. The method of claim 8 wherein said plurality of rates include full, half, quarter and eighth rates, and wherein the step of determining if said selected rate corresponds to a predetermined rate determines if said selected rate corresponds to said eighth rate.

10. The method of claim 8 wherein said selected decoding code is a Yamamoto check code, and wherein the step of comparing a selected decoding code to a selected value includes the step of determining if said selected Yamamoto code checks acceptably.

11. The method of claim 8 wherein said first, second and third values are error rate code threshold values, wherein the steps of comparing said selected error rate code to said first, second and third values determines whether said selected error rate code is less than said first, second and third threshold values, respectively, and wherein said second threshold value is greater than said third threshold value.

12. The method of claim 8 wherein said signal includes a plurality of frames including a current frame, and wherein the step of determining that said current rate of said signal is said selected rate includes the step of determining that said current frame is erased if said selected error rate code does not have said predetermined operational relationship to said first, second or third value.

13. The method of claim 8, further comprising the steps of:

- comparing at least another of said error rate codes to a minimum threshold error rate code based on a selected operational relationship; and
- determining that said signal is erroneous if said another of said error rate codes has said selected operational relationship to said minimum threshold.

14. The method of claim 8 wherein the steps of comparing include the step of comparing said selected error rate code to first, second and third weighting values plus said first, second and third values, respectively.

15. The method of claim 8 wherein the steps of comparing include the step of comparing said selected error rate code to first, second and third multiplicative factor times said first, second and third values, respectively.

16. The method of claim 8 wherein said first value is an error rate code threshold value, and wherein the method further includes the steps of:

- comparing said selected rate to a previous rate;
- decreasing said first threshold value if said selected rate and said previous rate are approximately equal; and
- increasing said first threshold rate if said selected rate and said previous rate are not equal.

17. In a communication system having means for transmitting that transmits to a receiver each of a plurality of frames at a current rate, wherein said current rate corresponds to one of a plurality of rates, said receiver comprising:

- means for generating a plurality of error check values each based on whether said current frame has one of said plurality of rates, wherein only a first check value of a selected rate favorably checks, and wherein said selected rate is one of said plurality of rates;
- means for generating a plurality of error rate codes each based on whether said current frame has one of said plurality of rates, wherein a selected error rate code corresponds to said selected rate;
- means for generating at least one decoding code, each decoding code being based on whether said current frame has one of said plurality of rates, wherein a selected decoding code corresponds to said selected rate;
- means, coupled to said means for generating a plurality of error rate codes, for determining if said selected rate of said selected error rate code corresponds to a predetermined rate;
- means, coupled to said means for generating a plurality of decoding codes, for comparing said selected decoding code to a selected value if said selected rate corresponds to said predetermined rate;
- means, coupled to said means for generating a plurality of error rate codes, for comparing said selected error rate code to a first value based on a predetermined operational relationship if said selected rate does not correspond to said predetermined rate for comparing said selected error rate code to a second value based on said predetermined operational relationship if said selected decoding code corresponds to said selected value, and for comparing said selected error rate code to a third value based on said predetermined operational relationship if said selected decoding code does not correspond to said selected value; and
- means, coupled to said means for comparing said first, second and third values, for determining that said current rate of said current frame is said selected rate if said selected error rate code has said predetermined operational relationship to said first, second or third value.

18. The receiver of claim 17 wherein said means for generating a plurality of error check values generates a plurality of cyclic redundancy check values, wherein said means for generating a plurality of error rate codes generates a plurality of symbol error rates, and wherein said means for generating a plurality of decoding codes generates a plurality of Yamamoto check codes.

19. The receiver of claim 17 wherein said plurality of rates include full, half, quarter and eighth rates, and wherein said means for determining if said selected rate of said selected error rate code corresponds to a predetermined rate includes means for determining if said selected rate corresponds to said eighth rate.

20. The receiver of claim 17 wherein said means for generating a plurality of decoding codes generates a plurality of Yamamoto check codes, and wherein said means for comparing said selected decoding code to a selected value includes means for determining if said selected Yamamoto code checks acceptably.

21. The receiver of claim 17 wherein said first, second and third values are error rate code threshold values, wherein said means for comparing said selected error rate code to said first, second and third values includes means for determining whether said selected error rate code is less than said first, second and third threshold values, respectively, and wherein said second threshold value is greater than said third threshold value.

22. The receiver of claim 17 wherein said means for determining that said current rate of said current frame is said selected rate includes means for determining that said current frame is erased if said selected error rate code does not have said predetermined operational relationship to said first, second or third value.

23. The receiver of claim 17, further comprising:
  means for comparing at least another of said error rate codes to a minimum threshold error rate code based on a selected operational relationship; and
  means for determining that said current frame is erased if said another of said error rate codes has said selected operational relationship to said minimum threshold.

24. In a communication system having a transmitter that transmits a signal at a current rate, and wherein said current rate corresponds to one of a plurality of rates, a receiver comprising:
  an error check value generator configured to generate a plurality of error check values each based on whether said signal has one of said plurality of rates, wherein only a first check value of a selected rate favorably checks, and wherein said selected rate is one of said plurality of rates;
  an error rate code generator configured to generate a plurality of error rate codes each based on whether said signal has one of said plurality of rates, wherein a selected error rate code corresponds to said selected rate;
  a decoding code generator configured to generate at least a selected decoding code, based on whether said signal has said selected rate; and
  a decoder coupled to said error check value generator, error rate code generator and decoding code generator and configured to (a) determine if said selected rate of said selected error rate code corresponds to a predetermined rate, (b) compare said selected decoding code to a selected value if said selected rate corresponds to said predetermined rate, (c) compare said selected error rate code to a first value based on a predetermined operational relationship if said selected rate does not correspond to said predetermined rate, (d) compare said selected error rate code to a second value based on said predetermined operational relationship if said selected decoding code corresponds to said selected value, (e) compare said selected error rate code to a third value based on said predetermined operational relationship if said selected decoding code does not correspond to said selected value, (f) determine that said current rate of said signal is said selected rate if said selected error rate code has said predetermined operational relationship to said first, second or third value, and (g) decode said signal based on said selected rate.

25. The receiver of claim 24 wherein said error check value generator generates a plurality of cyclic redundancy check values, wherein said error rate code generator generates a plurality of symbol error rates, and wherein said decoding code generator generates a plurality of Yamamoto check codes.

26. The receiver of claim 24 wherein said plurality of rates include full, half, quarter and eighth rates, and wherein said decoder determines if said selected rate corresponds to said eighth rate.

27. The receiver of claim 24 wherein said decoding code generator generates a plurality of Yamamoto check codes, and wherein said decoder determines if said selected Yamamoto code checks acceptably.

28. The receiver of claim 24 wherein said first, second and third values are error rate code threshold values, wherein said decoder determines whether said selected error rate code is less than said first, second and third values, respectively, and wherein said second threshold value is greater than said third threshold value.

29. The receiver of claim 24 wherein said signal includes a plurality of frames, including a current frame, and wherein said decoder determines that said current frame is erased if said selected error rate code does not have said predetermined operational relationship to said first, second or third value.

30. The receiver of claim 24 wherein said decoder compares at least another of said error rate co des to a minimum threshold based on a selected operational relationship, and determines that said signal is erroneous if said another of said error rate codes has said selected operational relationship to said minimum threshold.

31. The receiver of claim 24 wherein said decoder compares said selected error rate code to first, second and third weighting values plus said first, second and third values, respectively.

32. The receiver of claim 24 wherein said decoder compares said selected error rate code to first, second and third multiplicative factors times said first, second and third values, respectively.

33. The receiver of claim 24 wherein said decoder compares said selected rate to a previous rate and decreases said first value if said selected rate and said previous rate are approximately equal.

34. A communication system comprising:
  a transmitter configured to transmit a signal at a current rate, wherein said current rate corresponds to one of a plurality of rates; and
  a receiver configured to receive said signal, said receiver including:
    an error check value generator configured to generate a plurality of error check values each based on whether said signal has one of said plurality of rates, wherein only a first check value of a selected rate favorably checks, and wherein said selected rate is one of said plurality of rates;
    an error rate code generator configured to generate a plurality of error rate codes each based on whether said signal has one of said plurality of rates, wherein a selected error rate code corresponds to said selected rate;
    a decoding code generator configured to generate a plurality of decoding codes each based on whether said signal has one of said plurality of rates, wherein a selected decoding code corresponds to said selected rate; and a decoder coupled to said error check value generator, error rate code generator and decoding code generator and configured to (a) determine if said s elected rate of said selected error rate code corresponds to a predetermined rate, (b) compare said selected decoding code to a selected value if said selected rate corresponds to said predetermined rate, (c) compare said selected error rate code to a first value based on a predetermined operational relationship if said selected rate does not correspond to said predetermined rate, (d) compare said selected error rate code to a second value based on said predetermined operational relationship if said selected decoding code corresponds to said selected value, (e) compare said selected error rate code to a third value based on said predetermined operational relationship if said selected decoding code does not correspond to said selected value, (f) determine that said current rate of said signal is said selected rate if said selected error rate code has said predetermined operational relationship to said first, second or third value, and (g) decode said signal based on said selected rate.

35. In a communication system having a transmitter that transmits to a receiver, said transmitter transmitting each of a plurality of frames at a current rate, wherein said current rate corresponds t o one of a plurality of rates, a method at said receiver for determining said current rate of a current frame comprising the steps of:

generating a plurality of error check values each based on whether said current frame has one of said plurality of rates, wherein only first and second error check values of first and second rates favorably check, and wherein said first and second rates are from said plurality of rates;

generating a plurality of error rate codes each based on whether said current frame has one of said plurality of rates, wherein first and second error rate codes correspond to said first and second rates;

comparing said first error rate code to said second error rate code plus a first value based on a predetermined operational relationship; and determining that said current rate of said current frame is said second rate if said first error rate code has said predetermined operational relationship to said second error rate code plus a first value, and otherwise deter mining that said current rate is said first rate.

36. The method of claim 35 wherein the step of generating a plurality of error check values generates a plurality of cyclic redundancy check values, and wherein the step of generating a plurality of error rate codes generates a plurality of symbol error rates.

37. The method of claim 35, further comprising the steps of:

comparing said first error rate code to a threshold value based on a selected operational relationship if said first error rate code does not have said predetermined operational relationship to said second error rate code plus a first value; and determining that said current frame is erased if said first error rate code has said selected operational relationship to said threshold value.

38. The method of claim 35 where in the step of comparing compares said first error rate code to s aid second error rate codes times a multiplicative factor.

39. In a communication system having a transmitter and a receiver, said transmitter transmitting a signal at a current rate, wherein said current rate corresponds to one of a plurality of rates, and wherein said receiver generates a plurality of error check values and error rate codes each based on whether said signal has one of said plurality of rates, a method for determining said current rate of said signal comprising the steps of:

determining that only first and second error check values of first and second rates favorably check, wherein said first and second rates are from said plurality of rates;

comparing a first error rate code to a second error rate code plus a first value based on a predetermined operational relationship, wherein said first and second error rate codes correspond to said first and second rates; and determining that said current rate of said signal is said first rate if said second error rate code has said predetermined operational relationship to said second error rate code plus a first value, and otherwise determining that said current rate is said first rate.

40. The method of claim 39 wherein said first and second error check values are first and second cyclic redundancy check values, and wherein said first and second error rate codes are first and second symbol error rates.

41. The method of claim 39, further comprising the steps of: comparing said first error rate code to a n error rate code threshold value based on a selected operational relationship if said first error rate code does not have said predetermined operational relationship to said second error rate code plus a first value; and determining that said signal is erroneous if said first error rate code has said selected operational relationship to said threshold value.

42. The method of claim 39 wherein the step of comparing compares said first error rate code to said second error rate codes times a multiplicative factor .

43. The method of claim 39, further comprising the steps of:

generating at least a selected decoding code based on said first rate;

determining if said first rate corresponds to a predetermined rate;

if said first rate corresponds to said predetermined rate, comparing said selected decoding code to a selected value; and if said selected decoding code corresponds to said selected value, altering said first value.

44. In a communication system having means for transmitting that transmits each of a plurality of frames at a current rate, wherein said current rate corresponds to one of a plurality of rates, a receiver comprising:

means for generating a plurality of error check values each based on whether said current frame has one of said plurality of rates, wherein only first and second check values of first and second rates favorably check, and wherein said plurality of rates includes said first and second rates;

means for generating a plurality of error rate codes each based on whether said current frame has one of said plurality of rates, wherein first and second error rate codes correspond to said first and second rates;

means, coupled to said means for generating a plurality of error check values and said means for generating a plurality of error rate codes, for comparing said first error rate code to said second error rate code plus a first value based on a predetermined operational relationship; and means, coupled to said means for comparing, for determining that said current rate of said current frame is said second rate if said first error rate code has said predetermined operational relationship to said second error rate code plus a first value, and otherwise determining that said current rate is said first rate.

45. The receiver of claim 44 wherein said means for generating a plurality of error check values generates a plurality of cyclic redundancy check values, and wherein said means for generating a plurality of error rate codes generates a plurality of symbol error rates.

46. The receiver of claim 44, further comprising:

means for comparing said first error rate code to a threshold value based on a selected operational relationship if said first error rate code does not have said predetermined operational relationship to said second error rate code plus a first value; and means for determining that said current frame is erased if said first error rate code has said selected operational relationship to said threshold value.

47. The receiver of claim 44 wherein said means for comparing compares said first error rate code to said second error rate code times a multiplicative factor.

48. In a communication system having a transmitter that transmits each of a signal at a current rate, wherein said current rate corresponds to one of a plurality of rates, a receiver comprising:

an error check value generator configured to generate a plurality of error check values each based on whether said current frame has one of said plurality of rates, wherein only first and second check values of first and second rates favorably check, and wherein said first and second rates are from said plurality of rates;

an error rate code generator configured to generate a plurality of error rate codes each based on whether said current frame has one of said plurality of rates, wherein first and second error rate codes correspond to said first and second rates; and a decoder coupled to said error check value generator and error rate code generator and configured to compare said first error rate code to said second error rate code plus a first value based on a predetermined operational relationship, determine that said current rate of said current frame is said second rate if said first error rate code has said predetermined operational relationship to said second error rate code plus a first value, and otherwise determine that said current rate is said first rate.

49. The receiver of claim 48 wherein said error check value generator generates a plurality of cyclic redundancy check values, and wherein said error rate code generator generates a plurality of symbol error rates.

50. The receiver of claim 48 wherein said decoder compares said first error rate code to a threshold value based on a selected operational relationship if said first error rate code has said predetermined operational relationship to said second error rate code plus a first value determines that said current frame is erased if said first error rate code has said selected operational relationship to said threshold value.

51. The receiver of claim 48 wherein said decoder compares said first error rate code to a multiplicative factor times said second error rate code.

52. A communication system comprising:

a transmitter configured to transmit a signal at a current rate, wherein said current rate corresponds to one of a plurality of rates; and a receiver configured to receive said signal, said receiver including:

an error check value generator configured to generate a plurality of error check values each based on whether said current frame has one of said plurality of rates, wherein only first and second check values of first and second rates favorably check, and wherein said first and second rates are from said plurality of rates;

an error rate code generator configured to generate a plurality of error rate codes each based on whether said current frame has one of said plurality of rates, wherein first and second error rate codes correspond to said first and second rates; and a decoder coupled to said error check value generator and error rate code generator and configured to compare said first error rate code to said second error rate code plus a first value based on a predetermined operational relationship, determine that said current rate of said current frame is said second rate if said first error rate code has said predetermined operational relationship to said second error rate code plus a first value, and otherwise determine that said current rate is said first rate.

* * * * *

UNITED STATES PATENT AND TRADEMARK OFFICE
CERTIFICATE OF CORRECTION

PATENT NO : 5,751,725
DATED : April 12, 1998
INVENTOR(S) : Tao Chen

It is certified that error appears in the above-identified patent and that said Letters Patent are hereby corrected as shown below:

[19] On the caption, the name of the inventors should be listed as, "Tao Chen, et al."

[75] Under bracket 75, the Inventors should be listed as, "Tao Chen, San Diego; Roberto Padovani, San Diego, both of California.

Signed and Sealed this

Seventeenth Day of April, 2001

Attest:

NICHOLAS P. GODICI

Attesting Officer     Acting Director of the United States Patent and Trademark Office